US012198578B2

(12) United States Patent
Swensen et al.

(10) Patent No.: US 12,198,578 B2
(45) Date of Patent: *Jan. 14, 2025

(54) SPORTS PARAPHERNALIA DEVICES

(71) Applicant: Sports IOT LLC, Pullman, WA (US)

(72) Inventors: John Paul Swensen, Pullman, WA (US); James Sherman Swensen, Basellne, ID (US)

(73) Assignee: Sports IOT LLC, Pullman, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/500,872

(22) Filed: Nov. 2, 2023

(65) Prior Publication Data
US 2024/0062688 A1 Feb. 22, 2024

Related U.S. Application Data

(63) Continuation of application No. 16/824,387, filed on Mar. 19, 2020, now Pat. No. 11,810,480.

(60) Provisional application No. 62/821,103, filed on Mar. 20, 2019.

(51) Int. Cl.
| G09F 23/00 | (2006.01) |
| A63B 67/00 | (2006.01) |
| G06Q 30/0251 | (2023.01) |
| G09F 21/02 | (2006.01) |
| G09F 27/00 | (2006.01) |
| H04L 67/12 | (2022.01) |
| H04L 67/55 | (2022.01) |

(52) U.S. Cl.
CPC .............. *G09F 23/00* (2013.01); *A63B 67/00* (2013.01); *G06Q 30/0251* (2013.01); *G09F 21/023* (2020.05); *G09F 23/0066* (2013.01); *G09F 27/00* (2013.01); *H04L 67/12* (2013.01); *H04L 67/55* (2022.05); *A63B 2225/20* (2013.01)

(58) Field of Classification Search
CPC ........ G09F 23/00; G09F 27/00; G09F 21/023; G09F 23/0066; H04L 67/12; H04L 67/55; G06Q 30/0251; A63B 67/00; A63B 2225/20
See application file for complete search history.

(56) References Cited

U.S. PATENT DOCUMENTS

| 2008/0088421 | A1* | 4/2008 | McMillan | ............... | A63B 71/06 116/222 |
| 2015/0095456 | A1* | 4/2015 | Shah | ........................ | G06F 16/13 709/217 |
| 2015/0289034 | A1* | 10/2015 | Engman | .................. | G09F 27/00 463/31 |

* cited by examiner

*Primary Examiner* — Caroline H Jahnige
(74) *Attorney, Agent, or Firm* — Kirton McConkie; Brian Tucker (57) ABSTRACT

A sports paraphernalia device may be provided as a physical object that is configured to resemble a particular sports entity and that is configured to receive sports entity updates from a sports entity server. A sports entity can employ the sports entity server to send sports entity updates to sports paraphernalia devices to thereby interact directly with fans. Such interactions can include causing the sports paraphernalia devices to provide visual, audio or mechanical output.

19 Claims, 10 Drawing Sheets

SPORTS PARAPHERNALIA DEVICES

CROSS-REFERENCE TO RELATED APPLICATIONS

This application is a continuation of U.S. patent application Ser. No. 16/824,387 which was filed on Mar. 19, 2020 and has granted as U.S. Pat. No. 11,810,480 and which claims the benefit of U.S. Provisional Patent Application No. 62/821,103 which was filed on Mar. 20, 2019.

BACKGROUND

The Internet of Things (IoT) is the concept of connecting a wide variety of objects to the Internet. For example, a typical household may have a thermostat, an appliance, a doorbell or other "IoT devices" that are connected to the internet via a wireless access point. Such objects are typically designed as IoT devices to enable the user to control the objects remotely such as via a smart phone.

BRIEF SUMMARY

Embodiments of the present invention extend to sports paraphernalia devices, sports paraphernalia systems and related methods and computer program products. A sports paraphernalia device, such as an IoT device, may be provided as a physical object that is configured to resemble a particular sports entity and that is configured to receive sports entity updates from a sports entity server. A sports entity can employ the sports entity server to send sports entity updates to sports paraphernalia devices to thereby interact directly with fans. Such interactions can include causing the sports paraphernalia devices to provide visual, audio or mechanical output.

In some embodiments, a sports paraphernalia device may include a physical object that is structured to represent a particular sports entity, a controller, a network interface by which the controller receives sports entity updates from a sports entity server and one or more output devices to which the controller sends output control signals in response to receiving the sports entity updates. The network interface may be a wired or wireless network interface. The one or more output devices may include one or more visual output devices, one or more audio output devices or one or more mechanical output devices. The sports paraphernalia device may also include one or more user input devices.

In some embodiments, a sports paraphernalia system may include a sports entity server and one or more sports paraphernalia devices. Each sports paraphernalia device may include a physical object that is structured to represent a particular sports entity, a controller, a network interface by which the controller receives sports entity updates from a sports entity server and one or more output devices to which the controller sends output control signals in response to receiving the sports entity updates.

In some embodiments, a sports paraphernalia device may include a physical object that is structured to represent a particular sports entity, a controller, a network interface by which the controller receives sports entity updates from a sports entity server where the sports entity updates define sports entity game events and one or more output devices to which the controller sends output control signals in response to receiving the sports entity updates to thereby cause the sports paraphernalia device to notify a fan of the sports entity game events. The one or more output devices may include one or more visual output devices and the output control signals may include visual output control signals that cause the one or more visual output devices to output one or more visual indications of the sports entity game events. The one or more output devices may additionally or alternately include one or more audio output devices and the output control signals may additionally or alternately include audio output control signals that cause the one or more audio output devices to output one or more audio indications of the sports entity game events. The one or more output devices may additionally or alternately include one or more mechanical output devices and the output control signals may additionally or alternately include mechanical output control signals that cause the one or more mechanical output devices to output one or more motion indications of the sports entity game events.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only example embodiments of the present invention and are not therefore to be considered limiting of its scope, the present invention will be described and explained with additional specificity and detail through the use of the accompanying drawings in which.

DETAILED DESCRIPTION

In this specification and the claims, the term "sports paraphernalia device" shall be construed as a physical object that is structured to represent a particular sports entity and that is configured to connect to the internet to communicate with the particular sports entity. A sports paraphernalia device may be an IoT device. The term "sports entity" should encompass leagues, sports, sporting events, teams and individuals and extends to traditional sports, fantasy sports and e-sports. A sports paraphernalia device may include one or more output devices that provide visual, audio, mechanical or other output in response to communications received from the particular sports entity. In some embodiments, a sports paraphernalia device may include one or more input devices that enable an end user to provide input. In some embodiments, such output and input devices may be integrated into and function in conjunction with the physical object to represent the particular sports entity. Examples of physical objects that are structured to represent a particular sports entity include a bobble-head, a flag, a pennant, clothing, stadium replicas, scoreboard replicas, statues, mugs, cell phone cases, picture frames, other objects having a color scheme, logo, letter, etc. of a sports entity, etc.

Figure 1A:
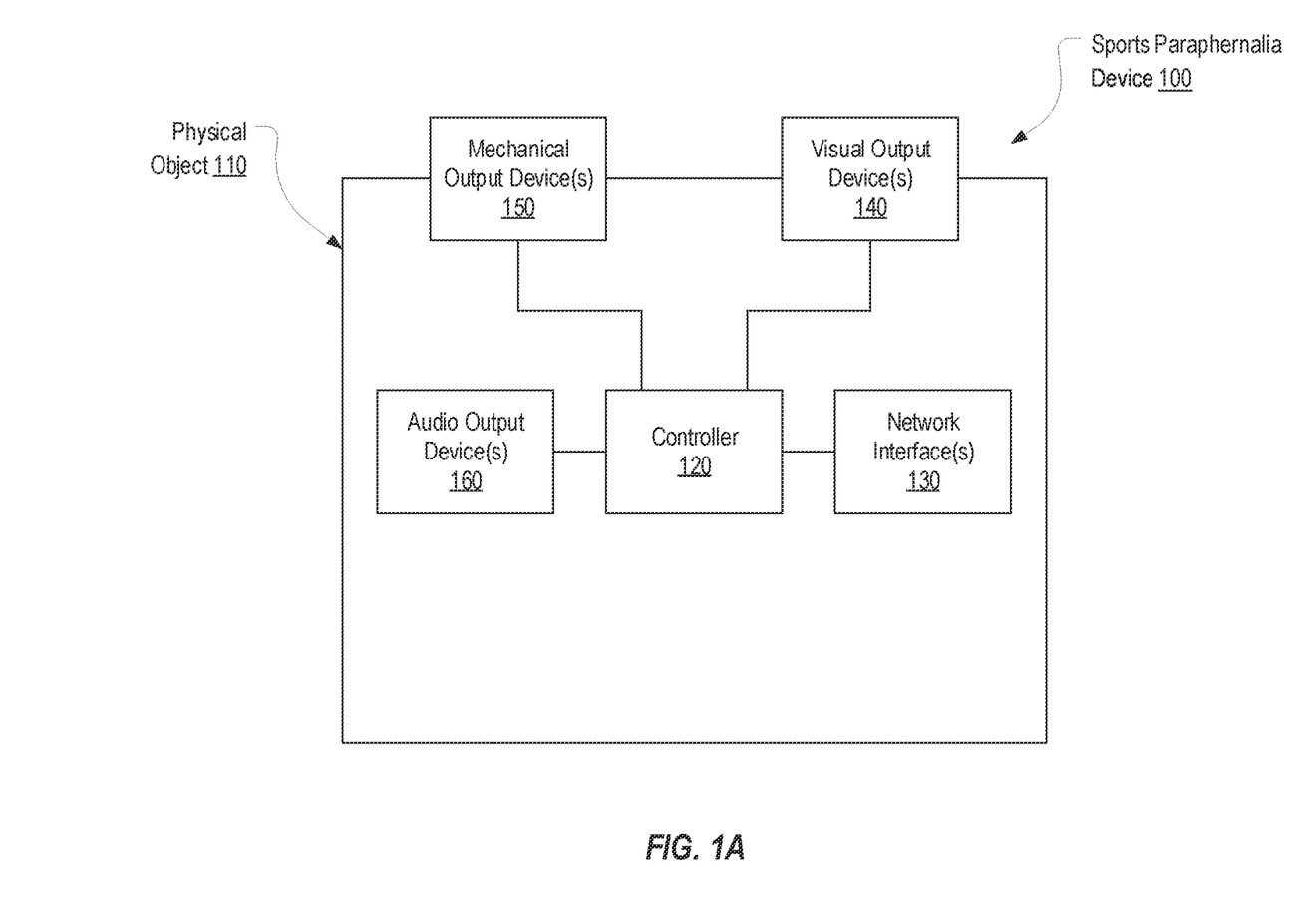
FIGS. 1A and 1B each illustrate an example of a sports paraphernalia device in accordance with embodiments of the present invention.

FIG. 1A provides a block diagram representing a sports paraphernalia device 100 that is configured in accordance with some embodiments of the present invention. Sports paraphernalia device 100 includes a physical object 110 that can be structured in a variety of ways to represent a particular sports entity. Various examples are provided below. Sports paraphernalia device 100 also includes a controller 120, one or more network interfaces 130, one or more visual output devices 140, one or more mechanical output devices 150 and one or more audio output devices 160. Although sports paraphernalia device 100 is shown as including visual output device(s) 140, mechanical output device(s) 150 and audio output device(s) 160, a sports paraphernalia device configured in accordance with embodiments of the present invention need not include each of these types of output devices and may include a single type of output device or any possible combination of output devices.

Controller 120 can represent any of the various types of circuitry that are capable of being configured, programmed or otherwise designed to perform the functionality described herein. For example, controller 120 could be a central processing unit, a microprocessor, a microcontroller, a field programming gate array, an application-specific integrated circuit, a system on a chip, etc. Network interface(s) 130 can represent circuitry that enables controller 120 to send and receive communications over a network. For example, network interface 130 may include a Wi-Fi-compliant controller, a Bluetooth-compliant controller, an Ethernet-compliant controller, etc.

Visual output device(s) 140 can represent any type of hardware that can provide visual output in response to control signals received from controller 120. For example, visual output device(s) 140 may include digital displays such as LCD, OLED or LED displays, discrete LEDs, light bulbs, etc. Mechanical output device(s) 150 can represent any moveable portion of physical object 110 and any underlying components that controller 120 may drive, actuate or otherwise control to move the portion of physical object 110. For example, mechanical output device(s) 150 may include a motor, a gear, a linear actuator, a shaft, a coupling, a joint, a bearing, a belt, a linkage, etc. Audio output device(s) 160 can represent any type of hardware that can provide audible output in response to control signals received from controller 120. For example, audio output device(s) 160 may include a speaker, a horn, a siren, etc.

Figure 1B:
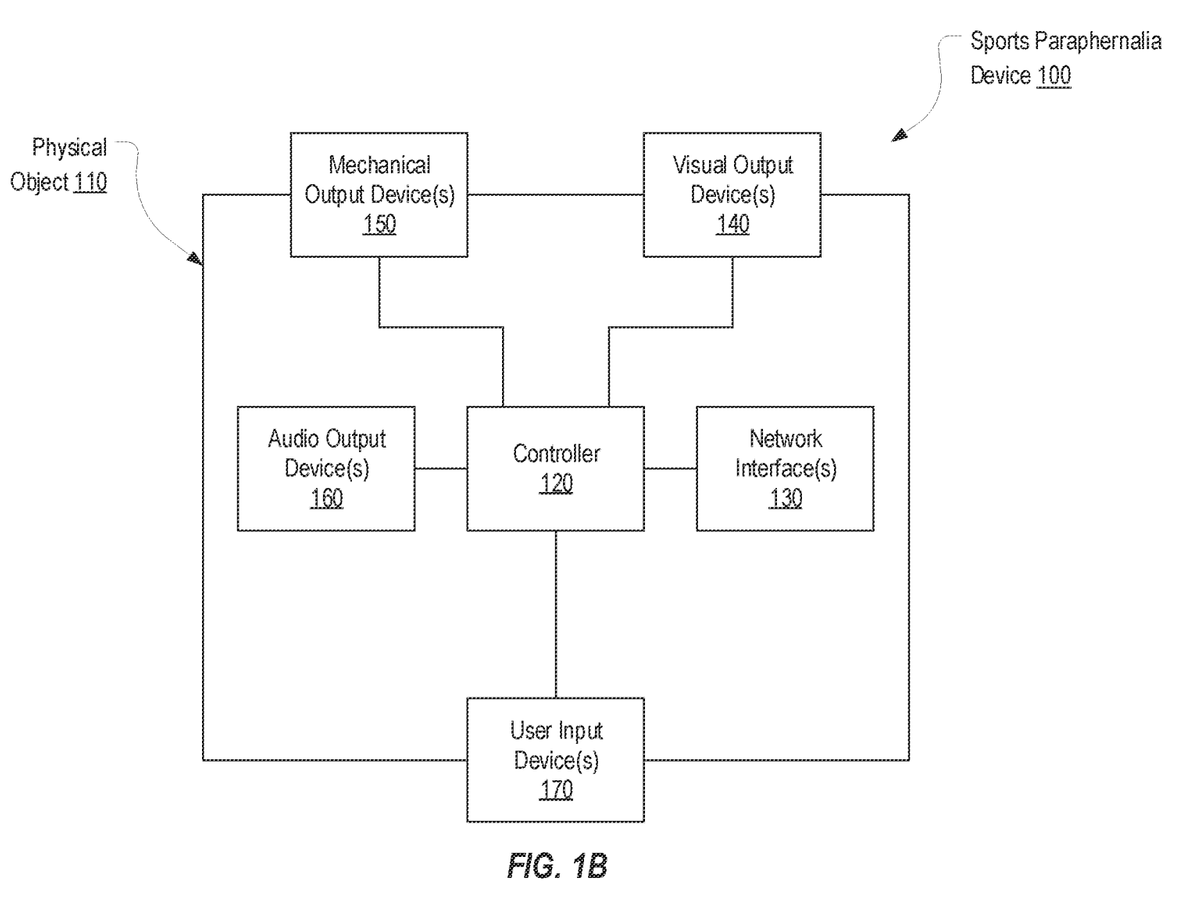

FIG. 1B provides a block diagram representing sports paraphernalia device 100 when it includes one or more user input devices 170. User input device(s) 170 can represent any component that enables a user to provide input to controller 120. For example, user input device(s) 170 may include a button, a switch, a touch screen, a microphone, a camera, a sensor, a scanner, etc.

Although not shown, sports paraphernalia device 100 can include firmware that controls/defines the functionality of the various components of the device. In some embodiments, controller 120 can be configured to allow this firmware to be updated over-the-air. For example, such over-the-air updates could be employed to customize the functionality of the various input and output devices that a sports paraphernalia device may include.

Figure 2A:
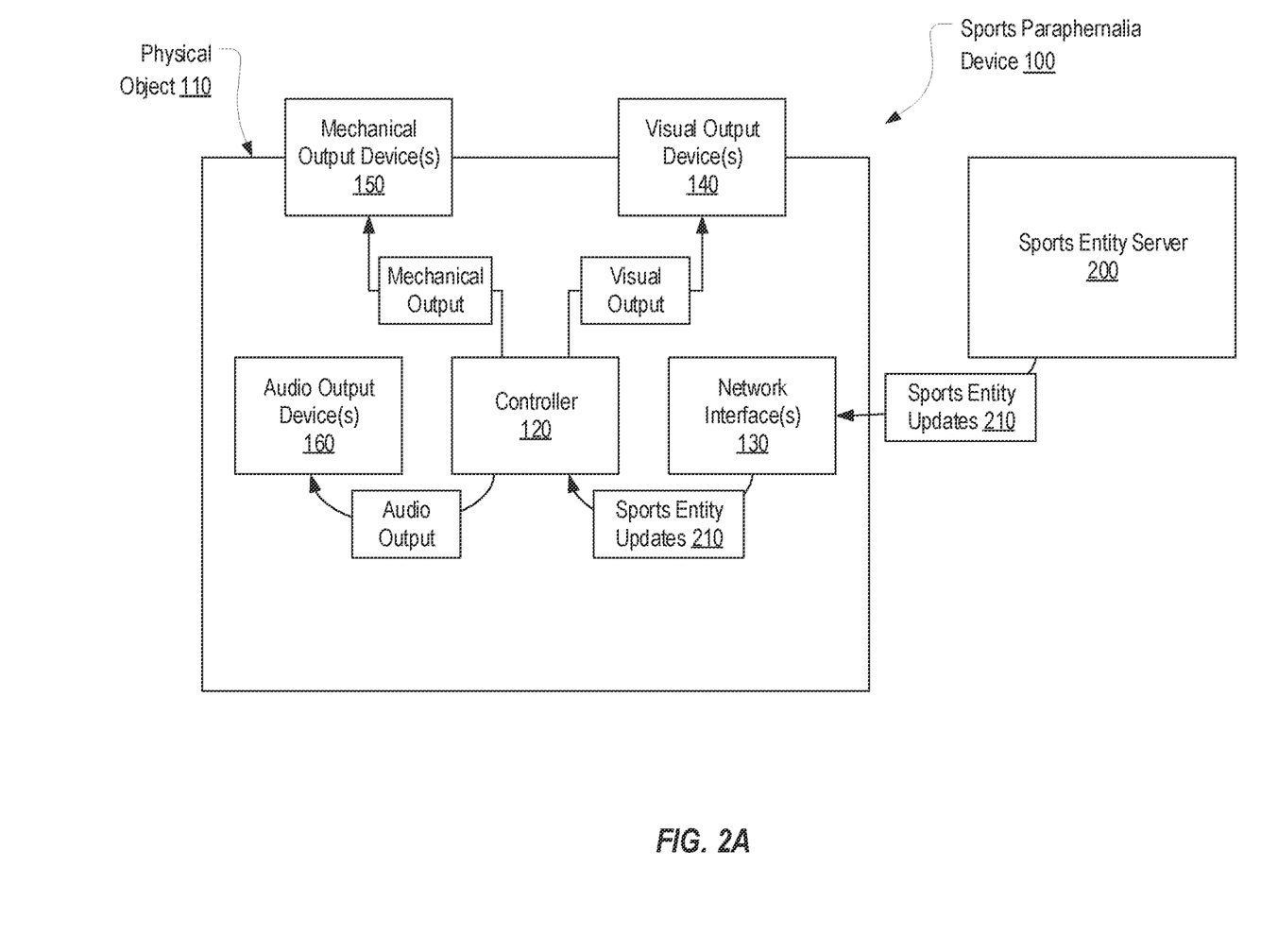
FIGS. 2A and 2B each illustrate examples of how the sports paraphernalia devices of FIGS. 1A and 1B may communicate with a sports entity server and interact with an end user.

FIG. 2A provides an example of how a sports entity, via a sports entity server 200, can communicate with sports paraphernalia device 100. More particularly, FIG. 2A represents how a sports entity may control the functionality of sports paraphernalia device 100 to thereby interact with fans. The combination of sports entity server 200 and one or more sports paraphernalia devices 100 can be considered a sports paraphernalia system. In typical embodiments, a sports paraphernalia system may include a large number of sports paraphernalia devices which could, and oftentimes would, be distributed over a large geographic area wherever the sports entity's fanbase may be located.

As shown, sports entity server 200 can send sports entity updates 210 to controller 120 via network interface(s) 130. Sports entity updates 210 can represent a wide variety of communications, examples of which are provided below. In some embodiments, sports entity updates 210 can define "sports entity game events." For purposes of this specification and the claims, a "sports entity game event" should be construed as an occurrence before, during, between and/or after a game or other competition in which the sports entity is participating. Examples of a sports entity game event include the start or end of a game, a quarter, a half or other period, a score, a significant play, a win, a loss or any other occurrence of which the sports entity desires to notify a fan.

Figure 2B:
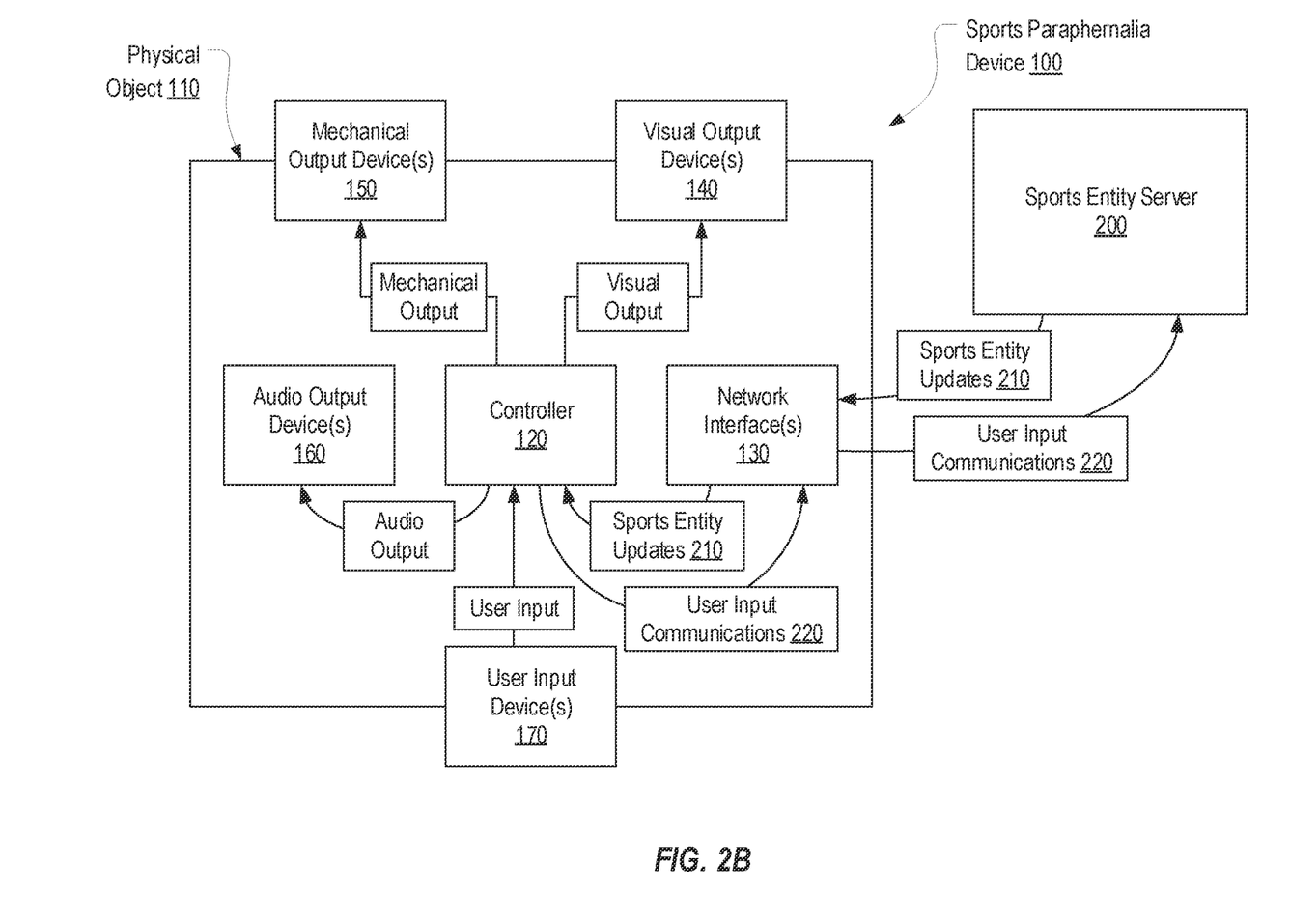

Whether sports entity updates 210 define a sports entity game event or some other occurrence or content, in response to receiving sports entity updates 210, controller 120 can generate and send visual output control signals to visual output device(s) 140, mechanical output control signals to mechanical output device(s) 150 and/or audio output control signals to audio output device(s) 160. FIG. 2B is similar to FIG. 2A but represents how controller 120 can send user input communications 220 to sports entity server 200 in response to receiving user input from user input device(s) 170. Accordingly, FIG. 2A represents embodiments where sports paraphernalia device 100 is configured for one-way communication, while FIG. 2B represents embodiments where sports paraphernalia device 100 is configured for two-way communication.

Figure 3:
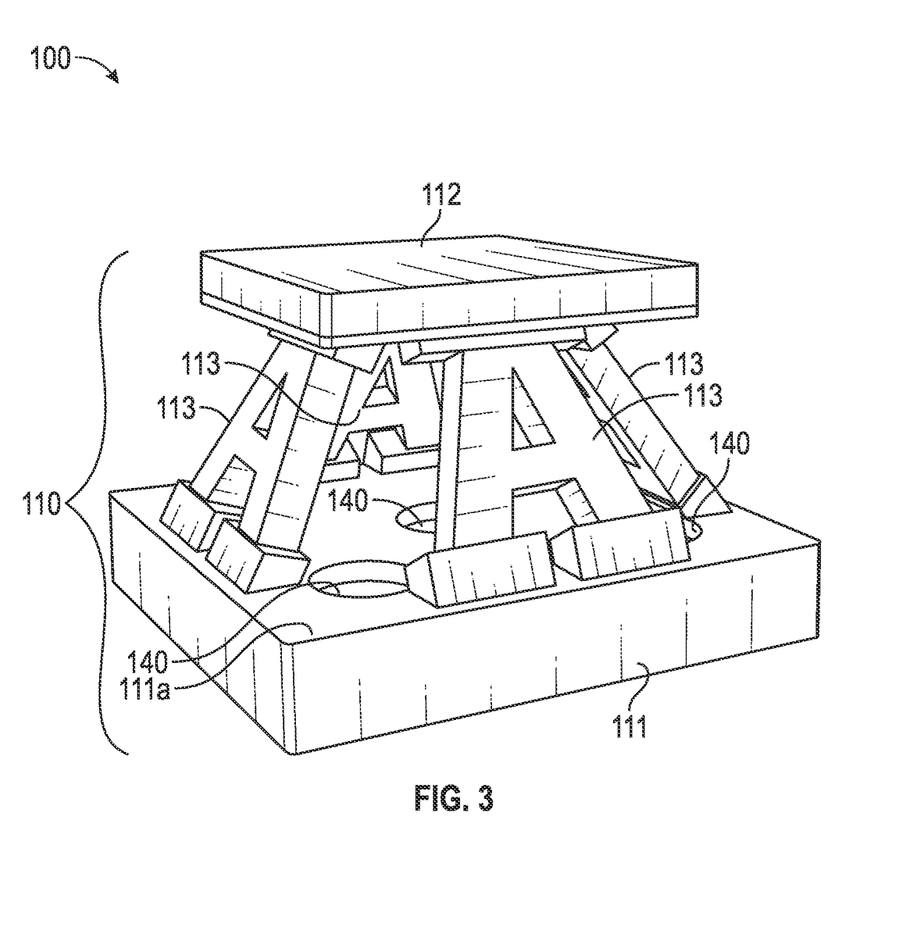
FIG. 3 provides an example of a sports paraphernalia device.

FIG. 3 provides an example where sports paraphernalia device 100 has a physical object 110 that is structured with a base 111, a top 112 and letters 113 that extend between base 111 and top 112. In some embodiments, letters 113 may represent the first letter of a team name. For example, in the depicted embodiment, there are four letter As 113 which may represent the Aggies. Each of letters 113 may be positioned on a top surface 111a of base 111 and angled inwardly with top 112 positioned on top of letters 113. Letters 113 may be spaced to create an open interior between base 111 and top 112. Top surface 111a of base 111 includes openings in which visual output devices 140 are positioned. In such embodiments, visual output devices 140 may be LEDs that illuminate the open interior between base 111 and top 112. In some embodiments, letters 113 may be translucent or transparent such that, when visual output devices 140 are illuminated, letters 113 may light up. In some embodiments, base 111 and top 112 may also be translucent or transparent. In some embodiments, base 111, top 112 and letters 113 may match a team's colors.

Controller 120 and network interface(s) 130 may be integrated into some portion of physical object 110 such as base 111. In response to receiving sports entity updates 210, controller 120 may generate visual output control signals to visual output devices 140 (e.g., LEDs) to cause visual output devices 140 to light up thereby illuminating letters 113, base 111 and/or top 112. In some embodiments, sports entity server 200 may send sports entity updates 210 in response to the sports entity winning a game, scoring or obtaining some other positive outcome to thereby cause controller 120 to light up sports paraphernalia device 100. In this way, the sports entity can directly control sports paraphernalia device 100.

Although not shown, the embodiment of sports paraphernalia device 100 depicted in FIG. 3 may also include audio output device(s) 160 (e.g., a speaker). In such embodiments, sports entity updates 210 can cause controller 120 to output audio output control signals to audio output device(s) 160 in addition to or separate from the visual output control signals. For example, sports entity updates 210 could cause controller 120 to play the sports entity's fight song, crowd noises, or other audio content when the sports entity wins a game, scores or obtains some other positive outcome. In some embodiments, such audio content could be stored locally by controller 120 or could be delivered as part of sports entity updates 210. As another example, sports entity updates 210 could include advertising content, team updates or other information about the sports entity that controller 120 may cause to be played.

The embodiment of sports paraphernalia device 100 depicted in FIG. 3 may also include mechanical output device(s) 150. For example, in response to receiving sports entity updates 210, controller 120 could provide mechanical output controls signals to actuate a mechanical output device 150 in the form of a vibration component to cause sports paraphernalia device 100 to vibrate when the sports entity wins, scores or obtains some other positive outcome. In short, a sports entity may employ sports entity server 200 to send sports entity updates 210 for causing controller 120 to generate visual output control signals, mechanical output control signals and/or audio output control signals during, after, before and/or between a game or other competition to thereby enhance the fan experience.

Figure 4:
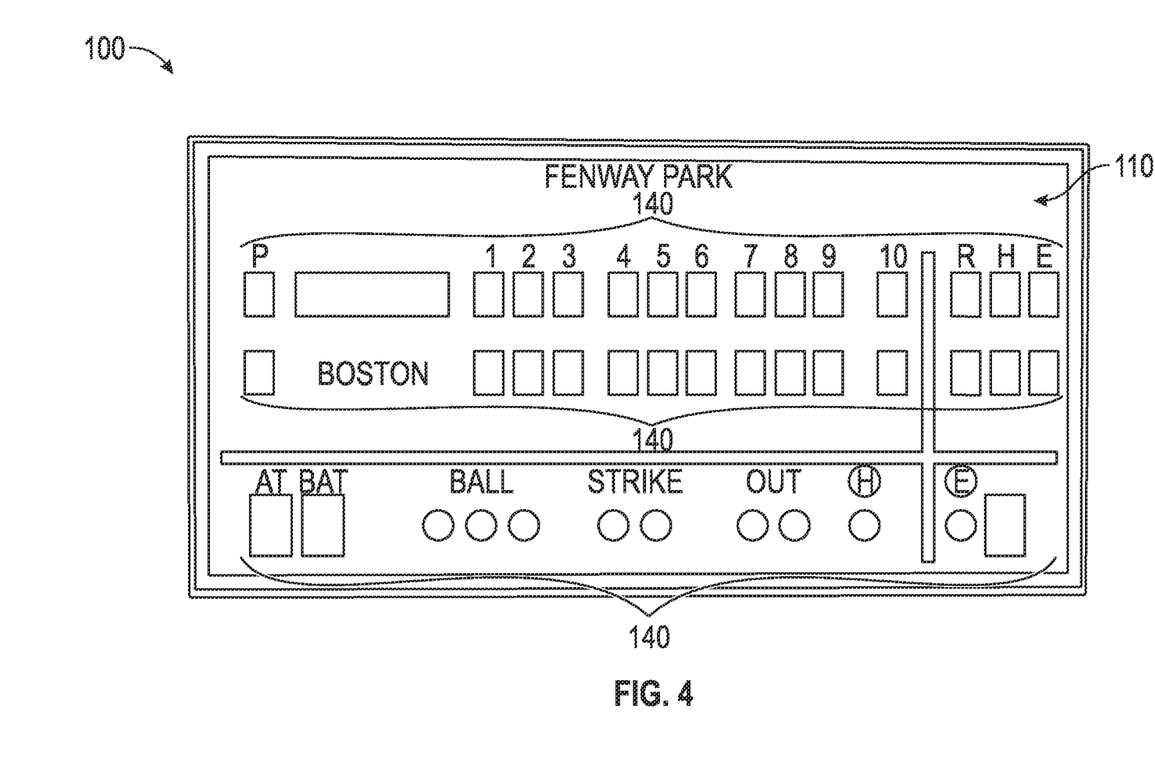
FIG. 4 provides another example of a sports paraphernalia device.

FIG. 4 provides another example where sports paraphernalia device 100 has a physical object 110 structured to resemble the Green Monster scoreboard at Fenway Park. As indicated, physical object 110 integrates a number of visual output devices 140 to which controller 120 can provide visual output control signals in response to sports entity updates 210. In particular, during a baseball game, a sports entity (e.g., the Boston Red Sox) may employ sports entity server 200 to send sports entity updates 210 that define values that controller 120 should cause to be displayed by each of visual output devices 140. In this way, the sports entity can implement a physical replica of the Green Monster scoreboard within the fan's home or any other location where the fan may employ sports paraphernalia device 100. Such embodiments of sports paraphernalia device 100 may equally include mechanical output device(s) 150 and/or audio output device(s) 160 in any of the manners described herein.

Figure 5:
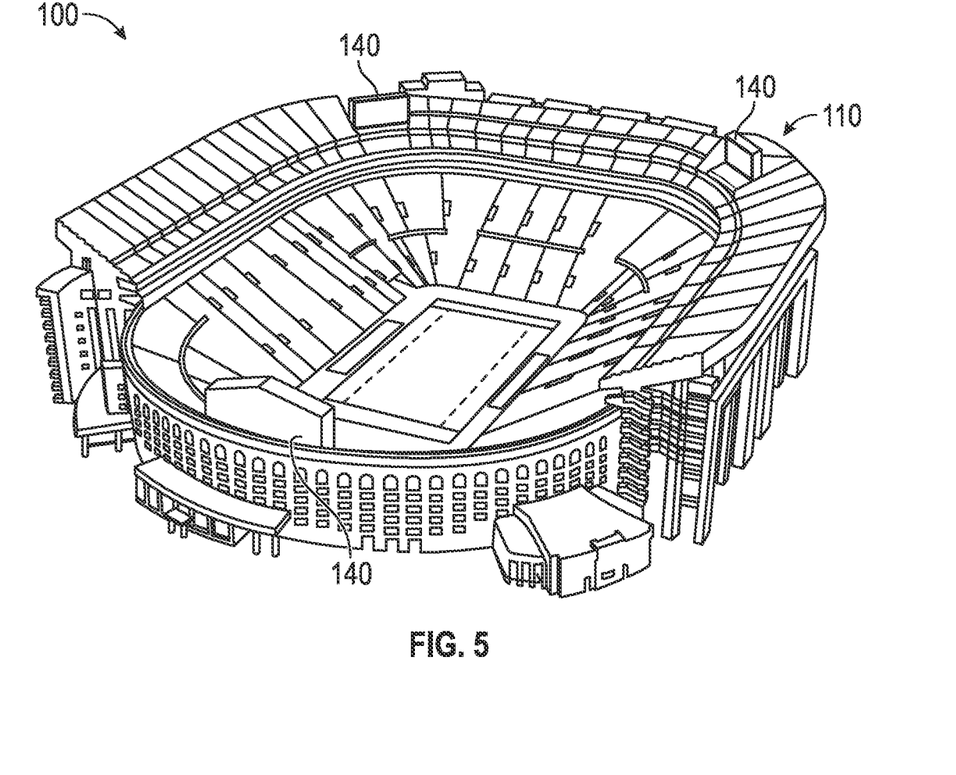
FIG. 5 provides another example of a sports paraphernalia device.

FIG. 5 provides another example where sports paraphernalia device 100 has a physical object 110 structured to resemble a football stadium. In such embodiments, in response to sports entity updates 210, controller 120 could generate and send visual update control signals to cause visual output devices 140 in the form of scoreboards to replicate what is currently being displayed on the corresponding scoreboard in the actual stadium (e.g., the score, the clock, replays, etc.). As other examples, the field, court or other game surface could be an output device 140 that shows formations, play success, shot selection, advertisements, etc. Audio output device(s) 160 could also be integrated into physical object 110. In such cases, the sports entity updates 210 could include/define crowd noise, the public address announcer, a broadcast, a fight song or other audio content, and controller 120 could generate and send audio output control signals to cause the audio content to be played via audio output device(s) 160. Mechanical output device(s) 150 could also be integrated into physical object 110. For example, a flag could be integrated into the field portion of the stadium. In such cases, sports entity updates 210 could cause controller 120 to generate and send mechanical output control signals to cause the flag to be waved when the team scores.

Figure 6:
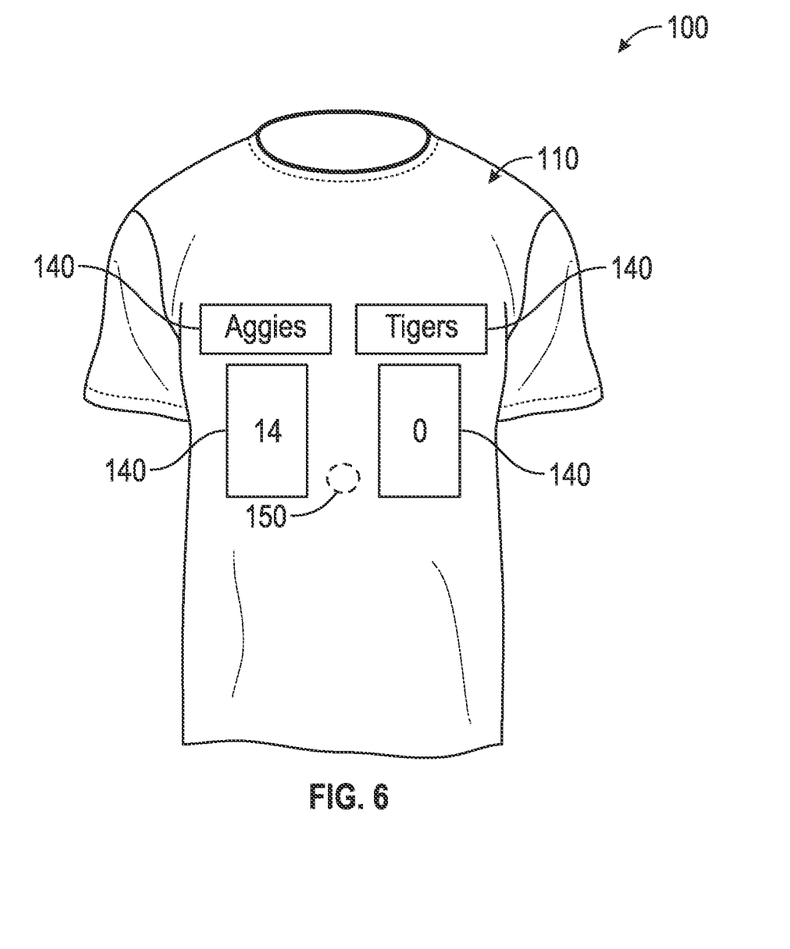
FIG. 6 provides another example of a sports paraphernalia device.

FIG. 6 provides another example where sports paraphernalia device 100 has a physical object 110 in the form of a shirt. In such embodiments, visual output devices 140 could be integrated into the shirt to represent a scoreboard. An audio output device 150 could also be integrated into the shirt and could be employed in a similar manner as described above.

FIGS. 3-6 represent only a few of many different types of physical objects 110 that sports paraphernalia device 100 may employ. Other examples include: a bobble head or statue that resembles a particular sports entity, player, mascot, etc. and includes visual output device(s) 140 on which the score, the players stats, team news, standings, or other information provided in sports entity updates 210 may be displayed; a wristband that includes visual output device(s) 140 that cause the wristband to glow gold, silver or bronze when sports entity updates 210 indicate that a sports entity won a medal or that cause the wristband to display a medal count and/or that includes mechanical output device(s) 150 that cause the wristband to vibrate when a medal is won; a soccer wristband or other wearable device or clothing that includes visual output device(s) 140 that flash a team flag, display a score, a team record, stats, etc. in response to sports entity updates 210, mechanical output device(s) that vibrate in response to sports entity updates 210 and/or audio output device(s) 160 that output an announcer yelling gooooaaaal in response to sports entity updates 210; a mug, cell phone case, stuffed animal or other object that includes visual output device(s) 140 that represent a scoreboard and audio output device(s) 160 for playing audio from a live event, among many other variations.

With each of the above-described examples and with any other variation of sports paraphernalia device 100, user input device(s) 170 may enable the fan to respond to sports entity updates 210 or otherwise interact with the sports entity via sports paraphernalia device 100. For example, sports entity updates 210 could include audio and/or visual advertising or promotional content that is output via audio output device(s) 160 and/or visual output device(s) 140. In response to such advertising or promotional content, the fan may provide input via user input device(s) 170 to cause controller 120 to send user input communications 220 to sports entity server 200. User input communications 220 could define a fan's vote in a poll, request to enter a contest, audio content (e.g., a cheer), request to purchase an item (e.g., tickets), etc. In some embodiments, controller 120 may be configured to provide a user interface on a separate computing device in response to receiving input via user input device(s) 170. In such embodiments, the user interface may allow the fan to provide additional input that can be sent directly to sports entity server 200.

Figure 7:
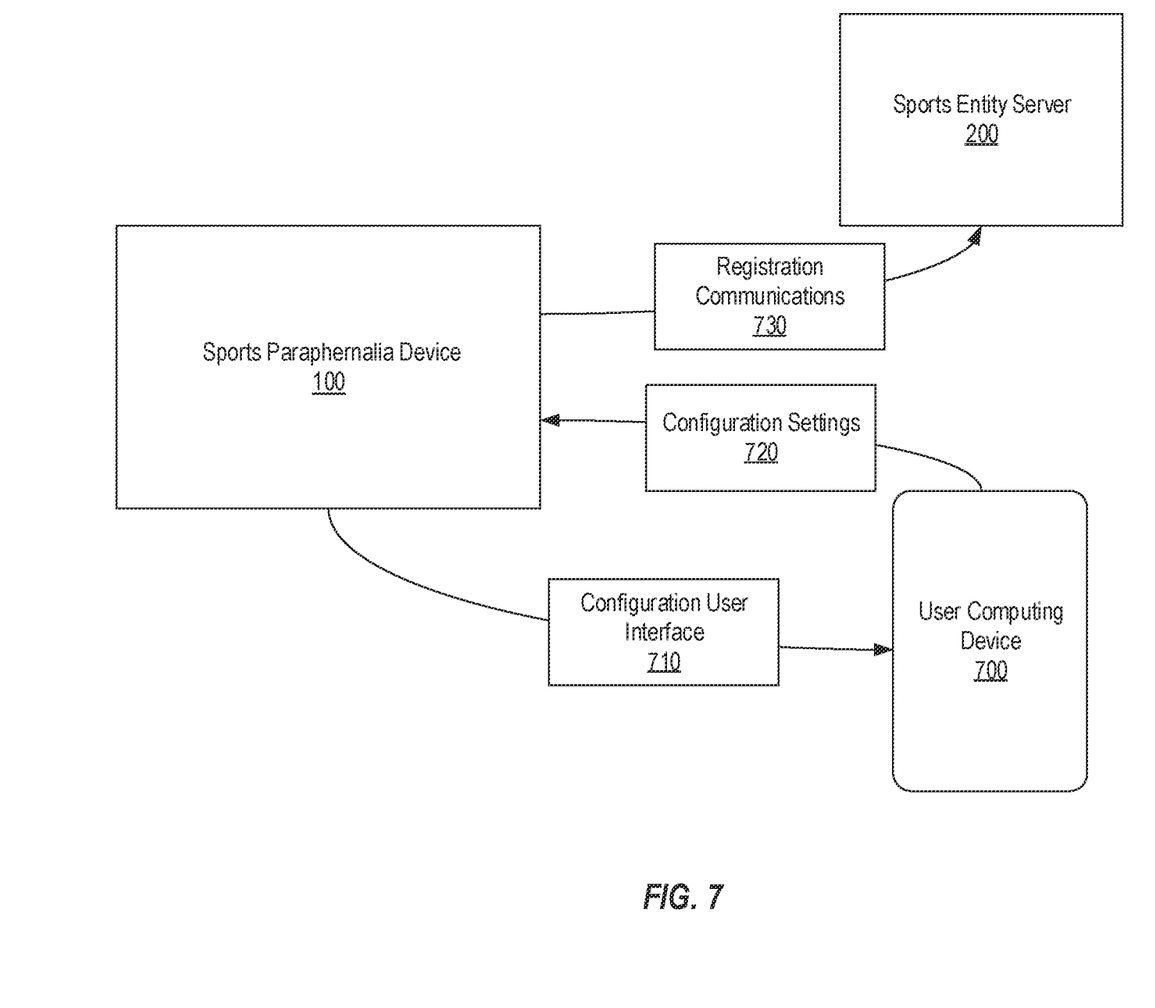
FIG. 7 illustrates an example of how a sports paraphernalia device may be configured.
Figure 7A:
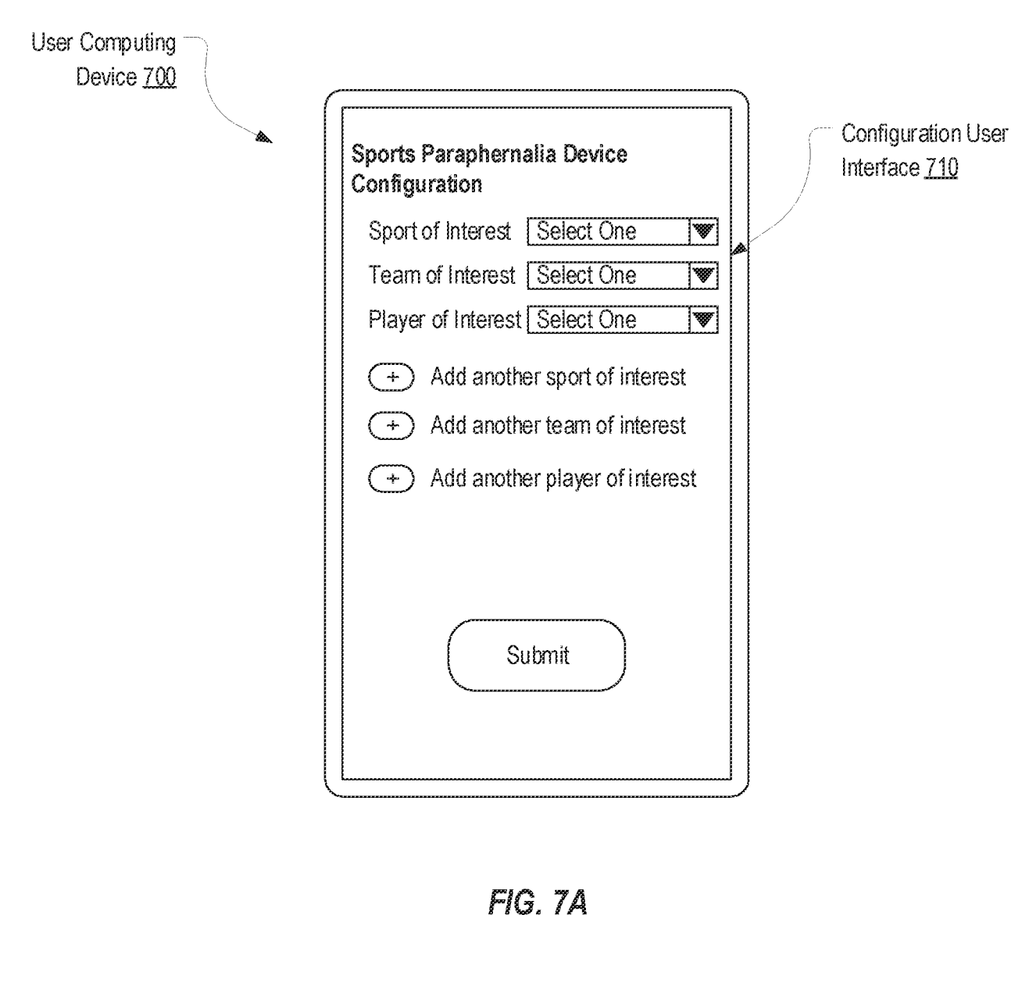
FIG. 7A illustrates an example user interface by which an end user may configure a sports paraphernalia device.

FIG. 7 illustrates an example of how sports paraphernalia device 100 can be registered to receive sports entity updates 210 from sports entity server 200. In some embodiments, controller 120 can provide a configuration user interface 710 (e.g., a webpage) that a fan can access via a user computing device 700. FIG. 7A provides an example of how configuration user interface 710 could be structured. As shown, configuration user interface 710 can provide options for selecting one or more sports of interest, one or more teams of interest, one or more players of interest, one or more statistics of interest, one or more graphical displays of interest, etc. In response to the fan's input to configuration user interface 710, user computing device 700 can send configuration settings 720 back to controller 120. Configuration settings 720 can identify which sport(s), team(s) and/or player(s) the fan selected. Next, controller 120 can generate and send registration communications 730 to sports entity server 200 which cause sports paraphernalia device 100 to be registered to receive sports entity updates 210 from sports entity server 200.

In some embodiments, registration communications 730 could include information about the fan including, for example, the fan's name, address, contact information and credit card or other payment information that sports entity server 200 can employ to complete a transaction in response to user input communications 220. In such embodiments, configuration user interface 710 could be configured to obtain such information. Alternately, sports entity server 200 could provide a website where the fan can directly register and provide such information. In some embodiments, firmware updates could be created and applied over-the-air on sports paraphernalia device 100 based on configuration settings 720. For example, a firmware update may be applied to cause one or more output devices to provide output specific to a selected team of interest.

Once sports paraphernalia device 100 is registered with sports entity server 200, sports entity server 200 can employ the content of registration communications 730 to identify how to deliver sports entity updates 210. For example, a particular sports entity may desire to distribute an advertisement to each sports paraphernalia device 100 that is registered to receive sports entity updates 210 pertaining to the particular sports entity. Similarly, the particular sports entity may desire to distribute advertisements to a subset of the sports paraphernalia devices 100 that are registered to receive sports entity updates 210 pertaining to the particular sports entity where the subset is defined by criteria specified in registration communications 730 (e.g., an age, gender, location, interest level, etc. of the respective fans). For example, a sports entity may employ sports entity server 200 to send sports entity updates 210 in the form of a game day ticket offer to each sports paraphernalia device 100 that was registered with an address within a specified distance of the game's location. As another example, a sports entity may employ sports entity server 200 to send sports entity updates 210 in the form of a promotion of a business partner's product to each sports paraphernalia device 100 that was registered by a fan within a particular age range or of a particular gender.

In response to receiving such sports entity updates in the form of advertisements, controller 120 of the respective sports paraphernalia devices 100 can cause the advertisements to be presented to the fans via visual output device(s) 140, mechanical output device(s) 150 and/or audio output device(s) 160. In some embodiments, the respective fans may then employ user input device(s) 170 to provide user input to accept an offer, make a purchase, or supply some other information that controller 120 can transmit back to sports entity server 200 as a response to the advertisement. Accordingly, sports entity server 200 can enable a sports entity to distribute targeted advertising directly to the sports paraphernalia devices of its fans, while sports paraphernalia devices 100 can enable fans to interact directly with such targeted advertising.

In summary, embodiments of a sports paraphernalia device may include a physical object that is structured to represent a particular sports entity, a controller, a network interface by which the controller receives sports entity updates from a sports entity server and one or more output devices to which the controller sends output control signals in response to receiving the sports entity updates. A sports entity may employ the sports entity server to send sports entity updates containing or defining a variety of content or information to many different sports paraphernalia devices. In this way, the sports entity may interface directly with its fans.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media are categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves. Because computer storage media and transmission media are disjoint categories, computer storage media does not include signals or carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A sports paraphernalia device comprising:
   a physical object that is structured to represent a particular sports entity and to distinguish from other sports entities;
   a controller;
   a network interface by which the controller receives sports entity updates from a sports entity server that is remote to the sports paraphernalia device;
   one or more output devices to which the controller sends output control signals in response to receiving the sports entity updates; and
   one or more user input devices which are integrated into and function in conjunction with the physical object that is structured to represent the particular sports entity;
   wherein, in response to sending one or more output control signals for a particular sports entity update, the controller is configured to receive user input related to the particular sports entity update from the one or more user input devices;
   wherein the controller is configured to send one or more communications to the sports entity server in response to the user input, the one or more communications identifying the user input.

2. The sports paraphernalia device of claim 1, wherein the particular sports entity update includes advertising content.

3. The sports paraphernalia device of claim 1, wherein the one or more output devices comprise a display device.

4. The sports paraphernalia device of claim 3, wherein the one or more input devices comprise the display device.

5. The sports paraphernalia device of claim 1, wherein the controller provides a configuration user interface by which a user inputs configuration information via a remote device for configuring the sports paraphernalia device.

6. The sports paraphernalia device of claim 5, wherein the controller sends at least some of the configuration information to the sports entity server.

7. The sports paraphernalia device of claim 6, wherein at least some of the sports entity updates are configured based on the configuration information.

8. The sports paraphernalia device of claim 5, wherein the controller uses the configuration information to configure one or both of the one or more output devices and the one or more input devices.

9. A sports paraphernalia system comprising:
   a sports entity server; and
   one or more sports paraphernalia devices that are remote from the sports entity server, each sports paraphernalia device comprising:
     a physical object that is structured to represent a particular sports entity and to distinguish from other sports entities;
     a controller;
     a network interface by which the controller receives sports entity updates from the sports entity server;
     one or more output devices to which the controller sends output control signals in response to receiving the sports entity updates; and
     one or more user input devices which are integrated into and function in conjunction with the physical object that is structured to represent the particular sports entity;
     wherein, in response to sending one or more output control signals for a particular sports entity update, the controller is configured to receive user input related to the particular sports entity update from the one or more user input devices:
     wherein the controller is configured to send one or more communications to the sports entity server in response to the user input, the one or more communications identifying the user input.

10. The sports paraphernalia system of claim 9, wherein the one or more output devices and the one or more user input device comprise a display device.

11. The sports paraphernalia system of claim 9, wherein the controller uses the configuration information to configure one or both of the one or more output devices and the one or more input devices.

12. The sports paraphernalia system of claim 9, wherein the controller sends at least some of the configuration information to the sports entity server.

13. A sports paraphernalia device comprising:
    a physical object that is structured to represent a particular sports entity and to distinguish from other sports entities;
    a controller;
    a network interface by which the controller receives sports entity updates from a sports entity server that is remote to the sports paraphernalia device;
    one or more output devices to which the controller sends output control signals in response to receiving the sports entity updates; and
    one or more user input devices which are integrated into and function in conjunction with the physical object that is structured to represent the particular sports entity;
    wherein, in response to sending one or more output control signals for a particular sports entity update, the controller is configured to receive user input related to the particular sports entity update from the one or more user input devices;
    wherein the one or more output devices comprise a display device;
    wherein the one or more input devices comprise the display device.

14. The sports paraphernalia device of claim 13, wherein the controller is configured to send one or more communications in response to the user input, the one or more communications identifying the user input.

15. The sports paraphernalia device of claim 14, wherein the particular sports entity update includes advertising content.

16. The sports paraphernalia device of claim 13, wherein the controller provides a configuration user interface by which a user inputs configuration information via a remote device for configuring the sports paraphernalia device.

17. The sports paraphernalia device of claim 16, wherein the controller sends at least some of the configuration information to the sports entity server.

18. The sports paraphernalia device of claim 17, wherein at least some of the sports entity updates are configured based on the configuration information.

19. The sports paraphernalia device of claim 16, wherein the controller uses the configuration information to configure one or both of the one or more output devices and the one or more input devices.

\* \* \* \* \*